US009503506B2

(12) United States Patent
Li et al.

(10) Patent No.: US 9,503,506 B2
(45) Date of Patent: Nov. 22, 2016

(54) TRANSIT-MODE-BASED WEBPAGE ACCESSING METHOD, SYSTEM, AND CRAWLER ROUTE SERVER

(71) Applicant: TENCENT TECHNOLOGY (SHENZHEN) COMPANY LIMITED, Shenzhen (CN)

(72) Inventors: Rui Li, Shenzhen (CN); Yu Xu, Shenzhen (CN); Dexian Chen, Shenzhen (CN); Weiyu Dou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 418 days.

(21) Appl. No.: 14/102,840

(22) Filed: Dec. 11, 2013

(65) Prior Publication Data
US 2014/0101294 A1    Apr. 10, 2014

Related U.S. Application Data

(63) Continuation of application No. PCT/CN2013/082342, filed on Aug. 27, 2013.

(30) Foreign Application Priority Data

Aug. 31, 2012  (CN) .......................... 2012 1 0319292

(51) Int. Cl.
G06F 15/173  (2006.01)
H04L 29/08   (2006.01)
H04L 12/727  (2013.01)

(52) U.S. Cl.
CPC ............ *H04L 67/04* (2013.01); *H04L 45/121* (2013.01); *H04L 67/02* (2013.01); *H04L 67/1008* (2013.01); *H04L 67/2814* (2013.01)

(58) Field of Classification Search
CPC ........................... H04L 45/00–45/748; H04L 67/1002–67/1012; H04L 67/2814
See application file for complete search history.

(56) References Cited

U.S. PATENT DOCUMENTS 6,185,619 B1 * 2/2001 Joffe ..................... G06F 9/505
                                                   709/223
6,760,775 B1 * 7/2004 Anerousis ............... H04L 29/06
                                                   709/229

(Continued)

FOREIGN PATENT DOCUMENTS

CN   102137168 A   7/2011
CN   102624920 A   8/2012

OTHER PUBLICATIONS

The World Intellectual Property Organization (WIPO) International Search Report for PCT/CN2013/082342 Nov. 28, 2013.

*Primary Examiner* — Brendan Higa
(74) *Attorney, Agent, or Firm* — Anova Law Group, PLLC

(57) ABSTRACT

A method for accessing webpages based on a transit mode is provided. A crawler route server receives a webpage access request sent from a client where the webpage access request contains identification of a target website to be accessed. The crawler route server obtains a target crawler server which has the fastest speed for accessing the target website corresponding to the identification of the target website to be accessed from at least one crawler server. Further, the method includes the crawler route server returns the identification of the target crawler server to the client, and the client accesses the target website through the target crawler server corresponding to the identification of the target crawler server.

15 Claims, 4 Drawing Sheets

(56) References Cited

U.S. PATENT DOCUMENTS

| | | | |
|---|---|---|---|
| 6,810,411 B1* | 10/2004 | Coughlin | H04L 29/12066 370/252 |
| 7,720,997 B1* | 5/2010 | Gourlay | H04L 12/5692 370/238 |
| 2002/0163882 A1* | 11/2002 | Bornstein | H04L 29/06 370/227 |
| 2002/0176427 A1* | 11/2002 | Noda | H04L 29/06 370/401 |
| 2003/0002484 A1* | 1/2003 | Freedman | H04L 45/02 370/352 |
| 2003/0009591 A1* | 1/2003 | Hayball | H04L 29/06 709/245 |
| 2003/0174648 A1* | 9/2003 | Wang | H04L 65/1013 370/235 |
| 2008/0183889 A1* | 7/2008 | Andreev | H04L 29/06 709/238 |
| 2008/0279222 A1* | 11/2008 | Fuller | H04L 12/5691 370/501 |

* cited by examiner

TRANSIT-MODE-BASED WEBPAGE ACCESSING METHOD, SYSTEM, AND CRAWLER ROUTE SERVER

CROSS-REFERENCES TO RELATED APPLICATIONS

This application is a continuation application of PCT Patent Application No. PCT/CN2013/082342, filed on Aug. 27, 2013, which claims priority of Chinese Patent Application No. 201210319292.6, filed on Aug. 31, 2012, the entire contents of all of which are incorporated by reference herein.

FIELD OF THE INVENTION

The present invention relates to the field of computer technologies, and in particular, to a method, a system and a crawler route server for accessing webpages based on a transit mode.

BACKGROUND

With the rapid development of mobile Internet technologies and the rapid growth of popularizing rate of mobile phones, more and more users use mobile browser clients to search and browse the Internet, and the demand is also growing.

Currently, there are two modes for mobile browser clients to access webpages: a direct connection mode and a transit mode. A direct connection mode refers that a mobile browser client creates directly Transmission Control Protocol (TCP) connection with a target website to be accessed using Hypertext Transport Protocol (HTTP) through a mobile network to exchange data. A transit mode refers that a mobile browser client creates TCP connection with a transit server using HTTP or other protocols, and then the transit server sends a HTTP request received from the mobile browser client to a target website server through some form of proxy and transmits the response returned from the target website server to the mobile browser client.

Comparing to the direct connection mode, the transit mode not only saves more network flow by using multiple methods, but also responds faster to the users' requests, bringing better user experience. Low end mobile phones that account for a big percentage of market share have low capacity memory and poor processing ability of Central Processing Unit (CPU). The mobile browser client cannot run JavaScript (JS) and render webpages. Therefore, the transit mode may be the best mode for the mobile browser client to access the webpages.

However, the existing technologies for webpage accessing have certain limitations. For example, under the existing networking mechanism, a website may be deployed in multiple network environments. But, in the transit mode of existing technology, the transit server sends the HTTP request received from the mobile browser client to a target website server only using some form of proxy, and the transit server and the target website server may belong to different network environments, resulting in slower access speed and less access efficient.

The disclosed methods and devices are directed to solve one or more problems set forth above and other problems.

BRIEF SUMMARY OF THE DISCLOSURE

One aspect of the present disclosure includes a method for accessing webpages based on a transit mode. A crawler route server receives a webpage access request sent from a client where the webpage access request contains identification of a target website to be accessed. The crawler route server obtains a target crawler server which has the fastest speed for accessing the target website corresponding to the identification of the target website to be accessed from at least one crawler server. Further, the crawler route server returns the identification of the target crawler server to the client, and the client accesses the target website through the target crawler server corresponding to the identification of the target crawler server.

Another aspect of the present disclosure includes a crawler route server. The crawler route server includes a receiving module, an obtaining module, and a sending module. The receiving module is configured to receive a webpage access request sent from a client. The webpage access request contains identification of a target website to be accessed. The obtaining module is connected to the receiving module and is configured to obtain a target crawler server which has the fastest speed for accessing the target website corresponding to the identification of the target website to be accessed received by the receiving module from at least one crawler server. Further, the sending module is connected to the obtaining module and is configured to return the identification of the target crawler server obtained by the obtaining module to the client, and the client accesses the target website through the target crawler server corresponding to the identification of the target crawler server.

Another aspect of the present disclosure includes a webpage access system based on a transit mode. The webpage access system includes a client, at least one crawler server, and a crawler route server. The client is configured to send a webpage access request containing identification of a target website to be accessed. The at least one crawler server is configured to connect respectively to the crawler route server and report speed of accessing the target websites to the crawler route server. The crawler route server is configured to receive the webpage access request from the client, and to obtain a target crawler server which has the fastest speed for accessing the target website corresponding to identification of the target website to be accessed from at least one crawler server and return the identification of the target crawler server to the client.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present invention or the existing technology, the figures which are needed to be used in the description of the present invention or the existing technology are briefly described in the following. Obviously, the figures in the following description are only some embodiments of the present invention, and it is easily for those skilled in the art to obtain other figures based on the following figures without creative work.

DETAILED DESCRIPTION

Reference will now be made in detail to exemplary embodiments of the invention, which are illustrated in the accompanying drawings.

Figure 6:
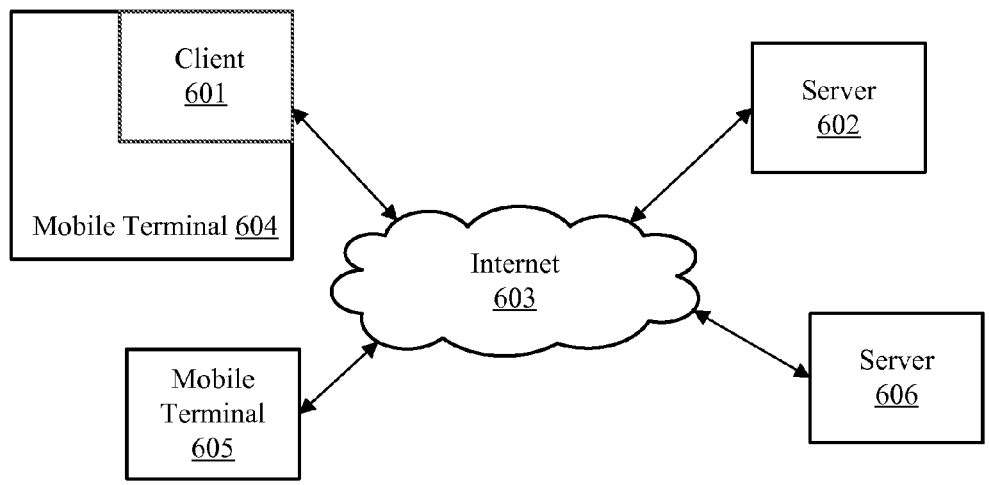
FIG. 6 illustrates an exemplary operating environment incorporating certain disclosed embodiments.

FIG. 6 illustrates an exemplary operating environment 600 incorporating certain disclosed embodiments. As shown in FIG. 6, environment 600 may include a mobile terminal 604, a mobile terminal 605, the Internet 603, a server 602, and a server 606. The Internet 603 may include any appropriate type of communication network for providing network connections to the mobile terminal 604 and the server 602 or among multiple terminals and servers. For example, Internet 603 may include the Internet or other types of computer networks or telecommunication networks, either wired or wireless.

A server, as used herein, may refer to one or more server computers configured to provide certain web server functionalities to provide certain personalized services, which may require any user accessing the services to authenticate to the server before the access. A web server may also include one or more processors to execute computer programs in parallel.

The server 602 and server 606 may include any appropriate server computers configured to provide certain server functionalities, such as proxy servers, crawler servers, and crawler route server, etc., or other application servers. Although only two servers are shown, any number of servers can be included. The server 602 and server 606 may be operated in a cloud or non-cloud computing environment.

Mobile terminal 604 and mobile terminal 605 may include any appropriate type of mobile computing devices, such as mobile phones, smart phones, tablets, notebook computers, or any type of mobile computing platform. A mobile terminal (e.g., mobile terminal 604) may include one or more clients 601. The client 601, as used herein, may include any appropriate mobile application software, hardware, or a combination of application software and hardware to achieve certain client functionalities. For example, client 601 may include a browser, etc. According to actual needs in different terminals, a mobile client may be a browser installed on the terminal for browsing, including various types of existing and future browser installed on terminals. Although only one client 601 is shown in the environment 600, any number of clients 601 may be included.

Mobile terminal 604/605, client 601, and/or server 602/606 may be implemented on any appropriate computing platform. FIG. 6 illustrates a block diagram of an exemplary computer system 700 capable of implementing mobile terminal 604/605, client 601, and/or server 602/606.

Figure 7:
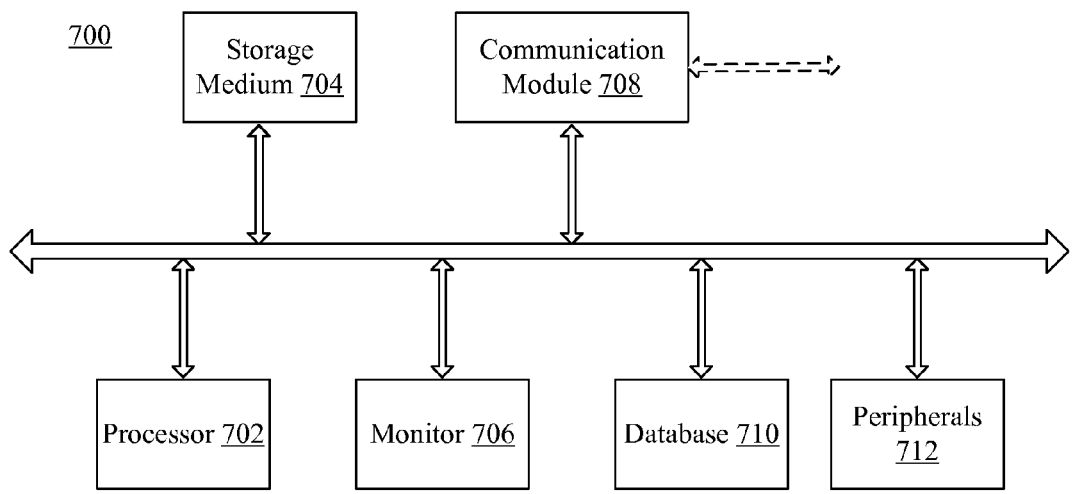
FIG. 7 illustrates a block diagram of an exemplary computer system consistent with the disclosed embodiments.

As shown in FIG. 7, computer system 700 may include a processor 702, a storage medium 704, a monitor 706, a communication module 708, a database 710, and peripherals 712. Certain devices may be omitted and other devices may be included.

Processor 702 may include any appropriate processor or processors. Further, processor 702 can include multiple cores for multi-thread or parallel processing. Storage medium 704 may include memory modules, such as Read-only memory (ROM), Random Access Memory (RAM), flash memory modules, and erasable and rewritable memory, and mass storages, such as CD-ROM, U-disk, and hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network. Database 710 may include one or more databases for storing certain data and for performing certain operations on the stored data, such as database searching.

In operation, mobile terminals/clients and servers 602 and 606 may interact with each other to provide a webpage access service to the user(s) of the mobile terminals. More particularly, the server 606 may be a crawler route server and the server 602 may be one or more crawler server for accessing webpages on the Internet (e.g., web servers). That is, a crawler route server may be used to facilitate the webpage accessing process. Because the crawler route server and/or the crawler server act as a transit server (e.g., a relay server, a proxy server, etc.), such access mode may also be referred as a transit-mode based webpage accessing.

Figure 1:
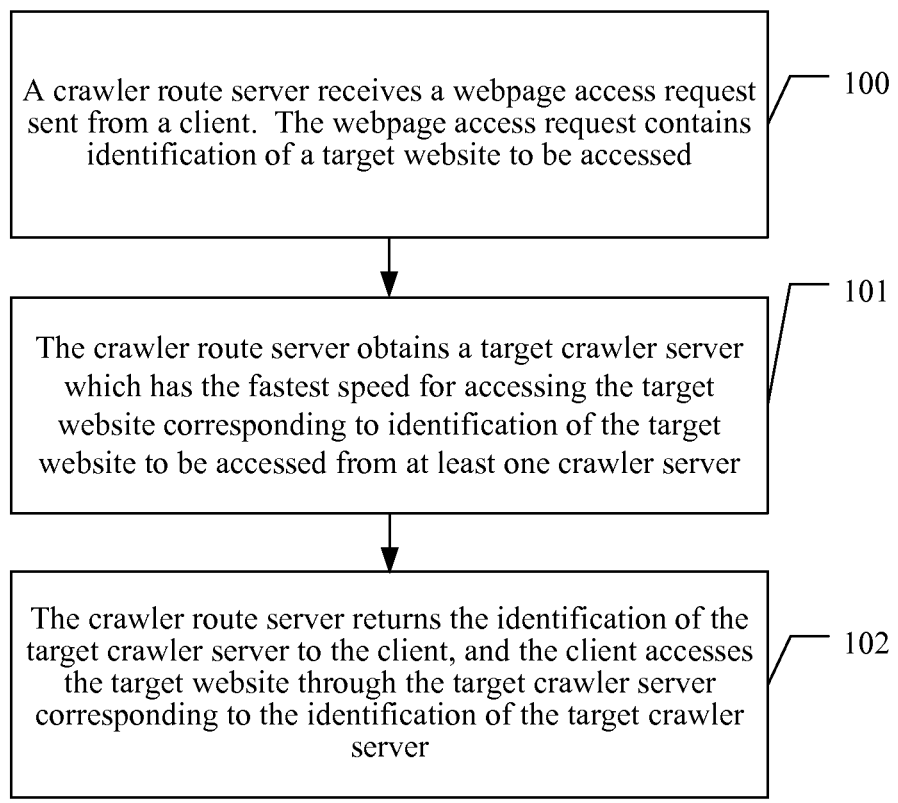
FIG. 1 illustrates a flow diagram of an exemplary webpage access method based on a transit mode consistent with the disclosed embodiments.

FIG. 1 illustrates a flow diagram of an exemplary webpage access method based on a transit mode consistent with the disclosed embodiments. As shown in FIG. 1, the webpage accessing process includes the following steps:

Step 100: the crawler route server receives a webpage access request sent from a client. The webpage access request contains identification of a target website to be accessed.

For example, the identification of the target website to be accessed may be Uniform/Universal Resource Locator (URL) of the target website, i.e., a web address of the target website.

It should be noted that the received webpage access request sent from the client may also be the webpage access request sent from the client through a proxy server. That is, the network may also include the proxy server that is used to receive the webpage access request sent from the client and transmit the webpage access request to the crawler route server.

Step 101: the crawler route server obtains the target crawler server which has the fastest speed for accessing the target website corresponding to the identification of the target website to be accessed from at least one crawler server.

Based on different Internet Service Providers (ISP), a network environment may deploy multiple crawler servers, and each crawler server may correspond to an ISP. For example, crawler servers may be deployed on the China Telecom Network, China Mobile network, China Unicom Network, and China Education Network, and the corresponding crawler servers may be named as CrawlerTelServer, CrawlerMobileServer, CrawlerUnicomServer, and CrawlerEduServer, respectively.

When accessing the Internet, accessing websites across different networks may cause larger network latency, resulting in a slower Internet connection speed. Network latency commonly refers to the time delay observed as data transmits from one point to another point. For example, if a computer from the China Telecom data center accesses a website deployed in the China Unicom data center, cross-network latency may be from millisecond (ms) level up to second level. Even when a computer from one China Telecom data center accesses a website deployed in another China Telecom data center, if a user does not choose an appropriate IP, latency may increase.

Thus, it can be understood that accessing websites across networks causes slower connection on the Internet. Therefore, a target crawler server which has the fastest speed for accessing the target website should be the crawler server that has the same ISP as the target website, that is, accessing the target website through the target crawler server is not a cross-network access. Comparing to other cross-network crawler servers, the crawler server that has the same ISP as the target website has a faster access speed.

Step 102: the crawler route server returns the identification of the target crawler server to the client, and the client accesses the target website through the target crawler server corresponding to the identification of the target crawler server.

The process that the client accesses the target website through the target crawler server is similar to the process that mobile browser client accesses the target website through the proxy server. The functionality of the crawler server is similar to the functionality of the proxy server. Specifically, the target crawler server may obtain IP of the target website based on domain name resolution of the target website. Then, the target crawler server accesses the target website based on the obtained IP of the target website.

This approach to accesses webpages based on the transit mode may be desired for mobile terminals (e.g. mobile phones) to access the webpages. The client may be a browser client on the mobile terminal.

Under this approach, the crawler route server receives the webpage access request sent from the client. The webpage access request contains identification of a target website to be accessed. Then, the crawler route server obtains the target crawler server which has the fastest speed for accessing the target website corresponding to the identification of the target website to be accessed from at least one crawler server. The crawler route server returns the identification of the target crawler server to the client, and the client accesses the target website through the target crawler server corresponding to the identification of the target crawler server. Thus, the crawler route server provides the best route for the client to access the target website through obtaining and providing the target crawler server which has the fastest speed for accessing the target website for the client, that is, the fastest route. Thus, access efficiency of the client can be increased and the user experience can be improved.

Further, before the crawler route server obtains the target crawler server which has the fastest speed for accessing the target website, for every crawler server among the at least one crawler servers, the crawler route server receives the network speed of last accessing the target website as reported by the crawler server. The network speed of last accessing the target website may be a reciprocal of connection time that the crawler server connects to the target website during the process of accessing the target website for the last time. The crawler route server stores the network speed of the crawler server accessing the target website from last time access. Further, the above described step may be performed before Step 100 is performed.

A longer connection time means a worse or undesired network condition and the slower or undesired access speed. On the other hand, a shorter connection time means the better or desired network condition and the faster or desired access speed. Therefore, the network speed of last-time accessing the target website is obtained by the crawler server based on a reciprocal of connection time that the crawler server connects to the target website during last-time accessing the target website. Specifically, the access network speed may equal to a reciprocal of connection time multiplied by a constant, where the constant may be determined according to the particular situation.

It should be noted that, in an actual situation, there are a lot of data that represent the network condition, for example, elapsed time, packet loss probability, etc. Because the crawler server may also be a HTTP proxy server, the crawler server may obtain accurately elapsed time for each stage of processing a HTTP request: connection time, time for sending a request, time for waiting for a response, time for receiving data. The connection time represents accurately the network condition from the crawler export to the web server of the target website. The shorter connection time means the better network condition. The network speed may then be calculated from the connection time.

For example, a commonly used method for checking the network condition from machine A to machine B is Ping. Therefore, the connection time needs to be compared with the result of the Ping operation, and the comparison result may be used to determine the reliability of the connection time used as value of the network speed. Some heavily accessed websites are selected as the testing targets. Table 1 shows Ping operation results and connection time of the tested websites.

TABLE 1

| Ping results and connection time | | | | | | | | | |
|---|---|---|---|---|---|---|---|---|---|
| im.m.taobao.com | | b2.wap.soso.com | | wapp.baidu.com | | nc.z.qq.com | | www.tianya.cn | |
| connect | ping | connect | ping | connect | ping | connect | ping | connect | ping |
| 32 | 31.3 | 29 | 29 | 38 | 38.7 | 29 | 28.9 | 22 | 21.5 |
| 32 | 25.9 | 29 | 28.9 | 38 | 38.4 | 29 | 28.8 | 22 | 21.6 |
| 26 | 25.8 | 29 | 29 | 38 | 38.4 | 29 | 29.2 | 22 | 21.3 |
| 32 | 31 | 29 | 29.3 | 38 | 38.4 | 30 | 28.8 | 22 | 21.4 |
| 27 | 25.9 | 29 | 29.1 | 38 | 38.3 | 29 | 28.7 | 22 | 21.5 |
| 27 | 26.3 | 28 | 29.1 | 39 | 38.3 | 29 | 28.9 | 18 | 21.5 |
| 26 | 26.2 | 29 | 29 | 38 | 38.4 | 29 | 29.2 | 22 | 21.4 |
| 32 | 25.8 | 29 | 29.5 | 39 | 38.3 | 29 | 28.8 | 17 | 21.4 |
| 26 | 26 | 29 | 29.1 | 38 | 38.4 | 29 | 28.8 | 18 | 21.5 |
| 28 | 31 | 29 | 29 | 38 | 38.2 | 30 | 28.8 | 22 | 21.5 |
| 26 | 31.1 | 29 | 29 | 39 | 38.3 | 29 | 28.8 | 18 | 21.5 |
| 26 | 26.6 | 29 | 29.1 | 38 | 38.5 | 29 | 28.7 | 22 | 21.4 |

As shown in Table 1, Ping operation results of each tested website are almost the same as the connection time. Thus, the connection time may represent accurately network condition. The access network speed may be determined by a reciprocal of connection time. The longer connection time means the worse network condition and the slower access speed. The shorter connection time means the better network condition and the faster access speed.

As every crawler server may access the target website, every crawler server needs to report the speed of accessing the target website to the crawler route server after accessing the target website. Thus, it may be required that every crawler server needs to report the speed of accessing the website to the crawler route server after accessing any website. Accordingly, the crawler route server needs to receive the speed of accessing the website reported by every crawler server after every crawler server accesses the website. Specifically, crawler route server may use the following data structure to store the speed of accessing the website reported by every crawler server.

```
struct CrawlerNode
{
    string sNodeName;   //Node Name
    vector<short> nSpeed;   //Node Speed
    int iReportTime;    // Reporting Time Point Last Time
};
``` where CrawlerNode represents the crawler server; sNodeName represents node name of the crawler server; nSpeed represents the node speed of the crawler server accessing the target website; iReportTime represents the reporting time point last time at which the crawler server reports the speed of the crawler server accessing the target website

```
struct CrawlerRouteDbStruct
{
    string sDomain;     //Domain Name
    vector<CrawlerNode> vCrawlerNodes;  //Crawler Nodes
    string sRtnnode;    // Return Node
    string sManualnode; // Manual Node
    int iUpdateTime;    //Time Point for Updating Other Slower Speed Nodes Last Time
};
``` where CrawlerRouteDbStruct represents data structure of the crawler route server, sDomain represents domain name of the target website to be accessed, where domain name is used to represent the target website in the data structure, vCrawlerNodes represents multiple crawler servers deployed in the network, and sRtnnode represents the target crawler server that has the fastest speed for accessing the target website obtained by the crawler route server from multiple crawler servers, and the crawler server that is returned to the client, so sRtnnode is also called return node.

Further, sManualnode represents the crawler server assigned forcibly by the crawler route server. For example, when the crawler route server determines ISP of the current target node, the crawler route server may assign forcibly a crawler server that has the same ISP with the target node as the sManualnode. As the crawler server that has the same ISP with the target website has a faster accessing speed than the crawler server that has a different ISP, a faster webpage accessing speed is ensured by forcibly assigning the crawler server that has the same ISP with the target website.

Further, if the crawler route server always forcibly assigns sManualnode, or the obtained target crawler server which has the fastest speed for accessing the target website corresponding to the identification of the target website to be accessed from at least one crawler server is always the same crawler server and other crawler servers have never been selected, the speed for accessing the target website of other crawler servers cannot be updated in time. Therefore, the speed for accessing the target website of other slower crawler servers (nodes) also needs to be tested periodically. iUpdateTime represents time point for updating other slower speed nodes last time. Further, after the crawler route server stores the network speed of the crawler server accessing the target website last time, Step 101 may also include: for every crawler server among at least one crawler server, the crawler route server calculates an effective network speed of the crawler server accessing the target website based on all stored network speed of accessing the target website.

Accordingly, in Step 101, the crawler route server obtains the crawler server with the fastest effective network speed of accessing the target website from at least one crawler server as the target crawler server.

It should be noted that, for every crawler server among at least one crawler server, based on all stored network speed of accessing the target website, the effective network speed of the crawler server accessing the target website is calculated by the below formula:

$$S = \sum_{i=1}^{n} s_i / n \qquad (1)$$

where S represents the effective network speed of the crawler server accessing the target website; n represents reporting times of the speed of accessing the target website reported by the crawler server; and $S_i$ represents the speed of accessing the target website reported by the crawler server every time.

The above calculation method is easy to implement and the computational complexity is low. However, under certain circumstances, there might exist certain issue.

For example, the speed of CrawlTelServer is always the fastest, while the speeds of other crawler servers are relatively slow. Due to a fluctuation in a very short period of time, the speed of CrawlTelServer suddenly becomes very slow, using the above method, the crawler route server may switch to other crawler servers based on the calculation result. This is a false determination. But it may be very difficult for the above method to overcome such false determination caused by network fluctuations.

To solve the false determination caused by the network fluctuations, for every crawler server among at least one crawler server, based on all stored network speed of accessing the target website and a constant, the effective network speed of the crawler server accessing the target website is calculated by the below formula:

$$S = \bar{s} + \frac{1}{a}\sqrt{\frac{1}{n}\sum_{i=1}^{n}(s_i - \bar{s})^2} \qquad (2)$$

where S represents the effective network speed of the crawler server accessing the target website; n represents the reporting times of the speed of accessing the target website reported by the crawler server; $s_i$ represents the speed of accessing the target website reported by the crawler server every time; $\bar{s}$ represents the average speed of accessing the target website reported by the crawler server for all times; and a is a constant. The standard deviation $(s_t-\bar{s})^2$ is used as a small weight of calculating the speed value to remove the miscalculation caused by the network fluctuations, effectively improving calculation accuracy of effective speed of the crawler server accessing the target website.

Further, the crawler server that accessed the target website among at least one crawler server reports network speed to the crawler route server. When the target crawler server which has the fastest speed for accessing the target website obtained by the crawler route server from at least one crawler server is always the same crawler server and other crawler servers have never been selected, the speed for accessing the target website of other crawler servers may be not updated and reported in time. In actual network condition, the speed of other crawler servers accessing the target website is not always slower than the speed of the previous selected crawler server accessing the target website. To avoid the situation, before Step 101 is performed, the crawler route server may also detect periodically the speed of at least one crawler server accessing the target website, especially the speed of other recently unselected crawler servers. To detect the speed of other recently unselected crawler servers, these crawler servers are made to accesses the target website, thus the speed of the crawler servers accessing the target website can be obtained.

It should be noted that the process for detecting periodically the speed of at least one crawler server accessing the target website and the process for reporting the speed of at least one crawler server accessing the target website may be performed at the same time. When the target crawler server which has the fastest speed for accessing the target website obtained by the crawler route server from at least one crawler server is always the same crawler server, and other crawler servers have never been selected, the crawler route server may also detect periodically the speed of other crawler servers among at least one crawler server (except the selected crawler server) accessing the target website.

Further, the crawler route server may also select the target crawler server based on ISP. The crawler route server may determine the crawler server that accesses the target website based on the type of ISP of the target website because the speed of the crawler server that has the same ISP as the target website is faster than speed of the crawler server that has a different ISP. Specifically, the crawler server that has the same ISP as the target website is selected as the target crawler server. For example, if the target website is a China Telecom Network website, CrawlerTelServer is selected as the target crawler server; if the target website is China Unicom Network, CrawlerMobileServer is selected as the target crawler server; and if the target website is China Education Network, CrawlerEduServer is selected as the target crawler server.

It should be noted that, in practical applications, any combination of the foregoing multiple actions and steps may be used, in any combination, as a separate embodiment.

Thus, for every access request, the crawler route server can select the best route of accessing the target website to ensure that the user's access request is responded in the fastest speed, providing the fastest network speed for users. The network condition of the target website can be accurately determined without the aid of any other tool and the target crawler server which has the fastest speed for accessing the target website can also be determined, providing the best route for the client to access the target website, that is, the fastest route. The access efficiency of the client can be increased and the user experience can be improved.

Figure 2:
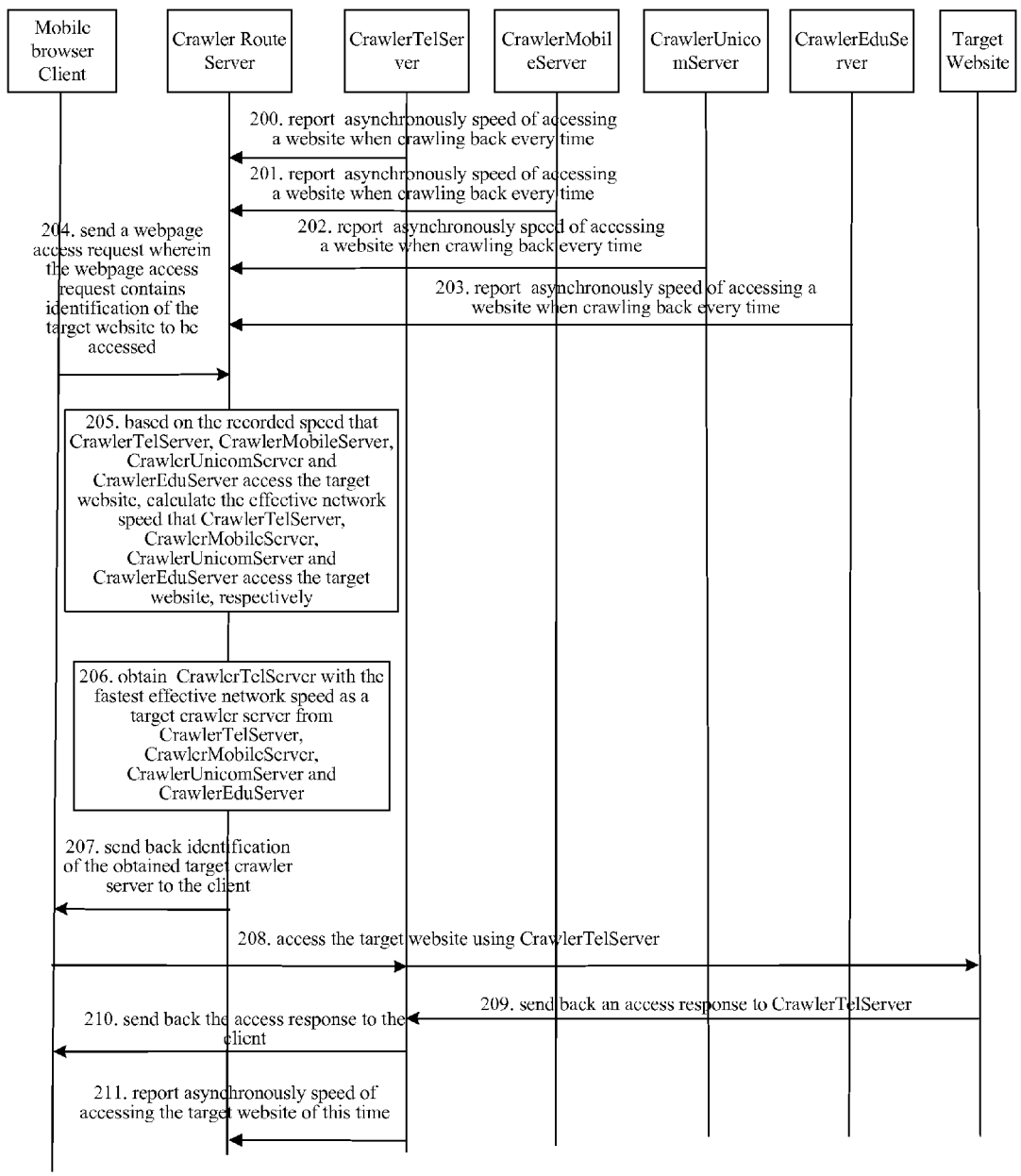
FIG. 2 illustrates a signaling diagram of another exemplary webpage access method based on a transit mode consistent with the disclosed embodiments.

FIG. 2 illustrates a signaling diagram of an exemplary webpage access method based on a transit mode consistent with the disclosed embodiments. As shown in FIG. 2, the method includes the following steps:

Step 200: CrawlerTelServer asynchronously reports speed of accessing a website to a crawler route server when CrawlerTelServer crawls back every time.

Step 201: CrawlerMobileServer asynchronously reports speed of accessing the website to the crawler route server when CrawlerMobileServer crawls back every time.

Step 202: CrawlerUnicomServer asynchronously reports speed of accessing the website to the crawler route server when CrawlerUnicomServer crawls back every time.

Step 203: CrawlerEduServer asynchronously reports speed of accessing the website to the crawler route server when CrawlerEduServer crawls back every time.

The CrawlerTelServer, CrawlerMobileServer, CrawlerUnicomServer, and CrawlerEduServe are used for illustrative purposes only, other crawler servers or any number of crawler servers may be used. Thus, the crawler route server may need to determine a desired crawler server from the at least one crawler servers including CrawlerTelServer, CrawlerMobileServer, CrawlerUnicomServer, and CrawlerEduServe.

When the crawler server crawls back every time, i.e., when the crawler server accesses any one website and returns every time. The crawler server needs to report the speed of accessing the website to the crawler route server at this time. The speed of accessing the website reported by the crawler servers may also be obtained based on a reciprocal of connection time that the crawler server connects to the target website.

Step 204: a mobile browser client sends a webpage access request to the crawler route server. The webpage access request contains identification of the target website to be accessed.

The client is a mobile browser client in FIG. 2. The webpage access request sent by the mobile browser client to the crawler route server may also be called an HTTP request.

Step 205: based on the recorded speed at which CrawlerTelServer, CrawlerMobileServer, CrawlerUnicomServer and CrawlerEduServer access the target website, the crawler route server calculates the effective network speed that CrawlerTelServer, CrawlerMobileServer, CrawlerUnicomServer and CrawlerEduServer access the target website, respectively.

The process for calculating the effective network speed that CrawlerTelServer, CrawlerMobileServer, CrawlerUnicomServer and CrawlerEduServer access the target website may be found in the above description in FIG. 1.

Step 206: the crawler route server obtains CrawlerTelServer, with the fastest effective network speed, as a target crawler server selected from CrawlerTelServer, CrawlerMobileServer, CrawlerUnicomServer, and CrawlerEduServer.

As used as an example, CrawlerTelServer has the fastest effective network speed of accessing the target website. In a practical application, any other crawler server (e.g., CrawlerMobileServer, CrawlerUnicomServer and CrawlerEduServer) may also have the fastest effective network speed of accessing the target website, which is not repeated here.

Step 207: the crawler route server sends back identification of the obtained target crawler server (e.g. CrawlerTelServer) to the client.

Step 208: the mobile browser client accesses the target website using CrawlerTelServer. For example, the mobile browser client accesses CrawlerTelServer which in turns access the target website.

Step 209: the target website sends back an access response to CrawlerTelServer.

Step 210: CrawlerTelServer sends back the access response to the client.

Step 211: CrawlerTelServer asynchronously reports speed of accessing the target website of this time to the crawler route server.

The speed of accessing the target website of this time reported by CrawlerTelServer may be obtained based on the reciprocal of connection time that the crawler server connects to the target website. When the client accesses the target website next time, based on the speed of CrawlerTelServer accessing the target website every time, the crawler route server calculates the effective network speed that CrawlerTelServer accesses the target website, similar to Step 205 above.

Thus, for every access request, the crawler route server can select the best route of accessing the target website to ensure that the user's access request is responded in the fastest speed, providing the fastest network speed for users. Further, the network condition of the target website can be accurately determined without the aid of any other tool, and the target crawler server which has the fastest speed for accessing the target website can also be determined, providing the best route for the client to access the target website, that is, the fastest route. The access efficiency of the client can be increased and the user experience can be improved.

Figure 3:
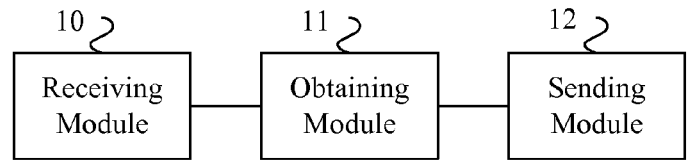
FIG. 3 illustrates a structure diagram of an exemplary crawler route server consistent with the disclosed embodiments.

FIG. 3 illustrates a structure diagram of an exemplary crawler route server consistent with the disclosed embodiments. As shown in FIG. 3, the crawler route server includes a receiving module 10, an obtaining module 11, and a sending module 12. Other modules may also be included in the crawler route server.

The receiving module 10 is configured to receive a webpage access request sent from a client. The webpage access request contains identification of a target website to be accessed.

The obtaining module 11 is connected to the receiving module 10. The obtaining module 11 is configured to obtain the target crawler server which has the fastest speed for accessing the target website corresponding to the identification of the target website to be accessed received by the receiving module 10 from at least one crawler server.

The sending module 12 is connected to the obtaining module 11. The sending module 12 is configured to return the identification of the target crawler server obtained by the obtaining module 11 to the client, and the client accesses the target website through the target crawler server corresponding to the identification of the target crawler server. Descriptions of the configurations and operations of the various modules may refer to the various processes described above and, therefore, are omitted.

In operation, the crawler route server receives the webpage access request sent from the client by the above modules. The webpage access request contains identification of a target website to be accessed. Then, the crawler route server obtains the target crawler server which has the fastest speed for accessing the target website corresponding to the identification of the target website to be accessed from at least one crawler server. The crawler route server returns the identification of the target crawler server to the client, and the client accesses the target website through the target crawler server corresponding to the identification of the target crawler server. Thus, the crawler route server provides the best route for the client to access the target website through obtaining and providing the target crawler server which has the fastest speed for accessing the target website for the client, that is, the fastest route.

Figure 4:
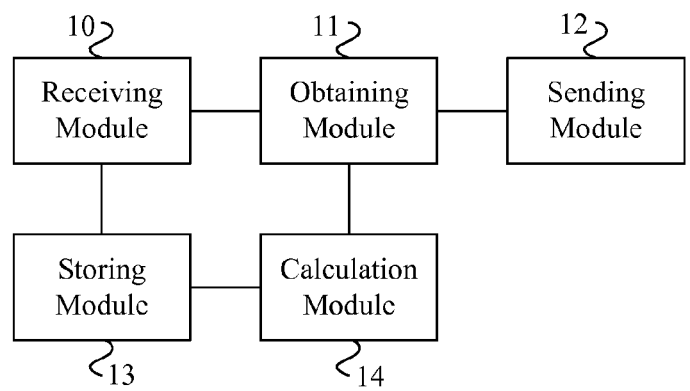
FIG. 4 illustrates a structure diagram of another exemplary crawler route server consistent with the disclosed embodiments.

FIG. 4 illustrates a structure diagram of an exemplary crawler route server consistent with the disclosed embodiments. As shown in FIG. 4, based on the crawler route server shown in FIG. 3, the crawler route server includes receiving module 10, obtaining module 11, sending module 12, a storing module 13 and a calculation module 14. At least one crawler server corresponds respectively to the different ISPs.

Before the obtaining module 11 obtains the target crawler server which has the fastest speed for accessing the target website corresponding to the identification of the target website to be accessed from at least one crawler server, for every crawler server among at least one crawler server, the receiving module 10 is configured to receive the network speed for accessing the target website last time reported by the crawler server. The network speed for accessing the target website last time is a reciprocal of connection time that the crawler server connects to the target website during the process of accessing the target website last time.

The storing module 13 is connected to the receiving module 10. The storing module 13 is configured to store the network speed for accessing the target website last time received by the receiving module 10 on the crawler server.

The calculation module 14 is connected to the storing module 13. The calculation module 14 is configured to, for every crawler server among at least one crawler server, calculate effective network speed of the crawler server accessing the target website based on all network speed of accessing the target website stored in the storing module 13 after the storing module 13 stores the network speed for accessing the target website last time and before the obtaining module 11 obtains the target crawler server which has the fastest speed for accessing the target website corresponding to the identification of the target website to be accessed from at least one crawler server.

The obtaining module 11 is connected to the calculation module 14. The obtaining module 11 is configured to obtain the crawler server with the fastest effective network speed of accessing the target website from at least one crawler server as the target crawler server based on the calculation result of the calculation module 14.

Further, for every crawler server among at least one crawler server, the calculation module 14, based on all network speed of accessing the target website stored in the storing module 13, is configured to calculate the effective network speed of the crawler server accessing the target website by the formula (1), $$S = \sum_{i=1}^{n} s_i/n,$$

as previously described.

For every crawler server among at least one crawler server, the calculation module 14, based on all network speed of accessing the target website and a constant stored in the storing module 13, is configured to calculate the effective network speed of the crawler server accessing the target website by the formula (2), $$S = \bar{s} + \frac{1}{a}\sqrt{\frac{1}{n}\sum_{i=1}^{n}(s_i - \bar{s})^2},$$

as previously described.

The crawler server may also include a detection module (the detection module is not shown in the FIG. 4). The detection module may be connected to the obtaining module 11. Before the obtaining module 11 obtains the target crawler server which has the fastest speed for accessing the target website corresponding to the identification of the target website to be accessed from at least one crawler server, the detection module 11 may be configured to detect periodically the speed of at least one crawler server accessing the target website. The obtaining module 11 obtains the target crawler server with the fastest speed of accessing the target website from at least one crawler server based on the speed of at least one crawler server accessing the target website detected by the detection module.

Figure 5:
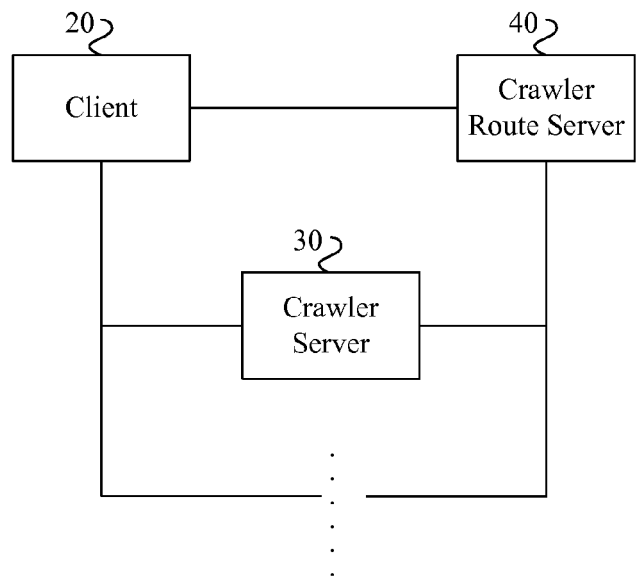
FIG. 5 illustrates a structure diagram of an exemplary webpage access system based on a transit mode consistent with the disclosed embodiments.

FIG. 5 illustrates a structure diagram of an exemplary webpage access system based on a transit mode consistent with the disclosed embodiments. As shown in FIG. 5, the webpage access system includes a client 20, at least one crawler server 30, and a crawler route server 40.

The client 20 is connected to the crawler route server 40. The client 20 is configured to send a webpage access request to the crawler route server 40. The webpage access request contains identification of a target website to be accessed.

The crawler route server 40 is configured to obtain the target crawler server which has the fastest speed for accessing the target website corresponding to the identification of the target website to be accessed from at least one crawler server 30. The crawler route server 40 is also configured to return the identification of the target crawler server to the client 20, and the client 20 accesses the target website through the target crawler server which corresponds to the identification of the target crawler server.

Specifically, the client may be a browser client of a mobile terminal, e.g., a mobile browser client. The client may also connect to every crawler server among at least one crawler server 30, thus the client 20 accesses the target website through the crawler server. At least one crawler server 30 may connect respectively to the crawler route server 40 and report speed of accessing the website to the crawler route server 40.

The webpage access system includes the client, at least one crawler server, and the crawler route server. The crawler route server receives the webpage access request sent from the client. The webpage access request contains identification of a target website to be accessed. Then, the crawler route server obtains the target crawler server which has the fastest speed for accessing the target website corresponding to the identification of the target website to be accessed from at least one crawler server. The crawler route server returns the identification of the target crawler server to the client, and the client accesses the target website through the target crawler server corresponding to the identification of the target crawler server. Thus, the crawler route server provides the best route for the client to access the target website through obtaining and providing the target crawler server which has the fastest speed for accessing the target website for the client, that is, the fastest route. The access efficiency of the client can be increased and the user experience can be improved.

It should be noted that, in the above crawler route server for accessing the webpages based on a transit mode, each functional module framing is only for illustrative purposes. In practical applications, the above functions are implemented by different functional modules according to the needs. That is, the internal structure of the device for accessing the webpages is divided into different functional modules to complete all or part of the functions described above.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems for accessing webpages based on a transit mode, the crawler route server receives the webpage access request sent from the client. The webpage access request contains identification of a target website to be accessed. Then, the crawler route server obtains the target crawler server which has the fastest speed for accessing the target website corresponding to the identification of the target website to be accessed from at least one crawler server. The crawler route server returns the identification of the target crawler server to the client, and the client accesses the target website through the target crawler server corresponding to the identification of the target crawler server. Thus, the crawler route server provides the best route for the client to access the target website through obtaining and providing the target crawler server which has the fastest speed for accessing the target website for the client, that is, the fastest route. The access efficiency of the client can be increased and the user experience can be improved.

What is claimed is:

1. A method for accessing webpages based on a transit mode, comprising:
    receiving, by a crawler route server, a webpage access request sent from a client, wherein the webpage access request contains identification of a target website to be accessed;
    obtaining, by the crawler route server, a target crawler server which has the fastest speed for accessing the target website corresponding to the identification of the target website to be accessed from at least one crawler server; and
    returning, by the crawler route server, the identification of the target crawler server to the client, wherein the client accesses the target website through the target crawler server corresponding to the identification of the target crawler server;

wherein before the crawler route server obtains the target crawler server which has the fastest speed, the method further includes:
receiving, by the crawler route server, network speed for accessing the target website last time reported by each crawler server among the at least one crawler server, wherein the network speed for accessing the target website last time is a reciprocal of connection time that each crawler server connects to the target website when accessing the target website last time; and
storing, by the crawler route server, the network speed for accessing the target website last time reported by each crawler server.

2. The method according to claim 1, wherein:
the at least one crawler server corresponds respectively to different ISPs.

3. The method according to claim 1, after the crawler route server stores the network speed for accessing the target website last time, and before the crawler route server obtains the target crawler server which has the fastest speed for accessing the target website, further including:
calculating, by the crawler route server, effective network speed of each crawler server accessing the target website for every crawler server among the at least one crawler server based on stored network speed of accessing the target website.

4. The method according to claim 1, wherein obtaining the target crawler server which has the fastest speed for accessing the target website corresponding to the identification of the target website to be accessed from at least one crawler server further includes:
obtaining, by the crawler route server, the crawler server with the fastest effective network speed of accessing the target website from at least one crawler server as the target crawler server.

5. The method according to claim 3, wherein:
for every crawler server among the at least one crawler server, based on the stored network speed of accessing the target website, the effective network speed of the crawler server accessing the target website is calculated by:

$$S = \sum_{i=1}^{n} s_i/n$$

where S represents the effective network speed of the crawler server accessing the target website; n represents reporting times of the speed of accessing the target website reported by the crawler server; and $s_i$ represents the speed of accessing the target website reported by the crawler server every time.

6. The method according to claim 3, wherein:
for every crawler server among at least one crawler server, based on the stored network speed of accessing the target website and a constant, the effective network speed of the crawler server accessing the target website is calculated by:

$$S = \bar{s} + \frac{1}{a}\sqrt{\frac{1}{n}\sum_{i=1}^{n}(s_i - \bar{s})^2}$$

where S represents the effective network speed of the crawler server accessing the target website; n represents the reporting times of the speed of accessing the target website reported by the crawler server; $s_i$ represents the speed of accessing the target website reported by the crawler server every time; $\bar{s}$ represents an average speed of accessing the target website reported by the crawler server for all times; and a is a constant.

7. The method according to claim 6, before the crawler route server obtains the target crawler server which has the fastest speed for accessing the target website corresponding to the identification of the target website to be accessed from at least one crawler server, further including:
detecting, by the crawler route server, periodically the speed of at least one crawler server accessing the target website.

8. A crawler route server, comprising one or more processors, memory, one or more program modules stored in the memory and to be executed by the one or more processors, the one or more program modules comprising:
a receiving module configured to receive a webpage access request sent from a client, wherein the webpage access request contains identification of a target website to be accessed;
an obtaining module configured to obtain a target crawler server which has the fastest speed for accessing the target website corresponding to the identification of the target website to be accessed from the at least one crawler server; and
a sending module configured to return the identification of the target crawler server to the client, and the client accesses the target website through the target crawler server corresponding to the identification of the target crawler server;
wherein the receiving module is configured to, for every crawler server among the at least one crawler server, receive the network speed for accessing the target website last time reported by the crawler server, and the network speed for accessing the target website last time is a reciprocal of connection time that the crawler server connects to the target website when accessing the target website last time, and
the crawler route server further includes a storing module configured to, before the obtaining module obtains the target crawler server which has the fastest speed for accessing the target website, store the network speed for accessing the target website last time received by the receiving module of the crawler route server.

9. The crawler route server according to claim 8, wherein:
the at least one crawler server corresponds respectively to different ISPs.

10. The crawler route server according to claim 8, further including:
a calculation module configured to, for every crawler server among at least one crawler server, calculate effective network speed of the crawler server accessing the target website based on all network speed of accessing the target website stored in the storing module, after the storing module stores the network speed for accessing the target website last time, and before the obtaining module obtains the target crawler server which has the fastest speed for accessing the target website.

11. The crawler route server according to claim 8, wherein:
the obtaining module is configured to obtain the crawler server with the fastest effective network speed of accessing the target website from at least one crawler server as the target crawler server.

12. The crawler route server according to claim 10, wherein:
the calculation module further configured to, for every crawler server among at least one crawler server, based on all network speed of accessing the target website stored in the storing module, calculate the effective network speed of the crawler server accessing the target website by:

$$S = \sum_{i=1}^{n} s_i/n$$

where S represents the effective network speed of the crawler server accessing the target website; n represents reporting times of the speed of accessing the target website reported by the crawler server; and $s_i$ represents the speed of accessing the target website reported by the crawler server every time.

13. The crawler route server according to claim 10, wherein:
the calculation module further configured to, for every crawler server among at least one crawler server, based on all network speed of accessing the target website and a constant stored in the storing module, calculate the effective network speed of the crawler server accessing the target website by:

$$S = \bar{s} + \frac{1}{a}\sqrt{\frac{1}{n}\sum_{i=1}^{n}(s_i - \bar{s})^2}$$

where S represents the effective network speed of the crawler server accessing the target website; n represents the reporting times of the speed of accessing the target website reported by the crawler server; $s_i$ represents the speed of accessing the target website reported by the crawler server every time; $\bar{s}$ represents an average speed of accessing the target website reported by the crawler server for all times; and a is a constant.

14. The crawler route server according to claim 13, further including:
a detecting module configured to, before the obtaining module obtains the target crawler server which has the fastest speed for accessing the target website corresponding to the identification of the target website to be accessed from at least one crawler server, detect periodically the speed of at least one crawler server accessing the target website.

15. A webpage access system based on a transit mode, comprising:
a client configured to send a webpage access request containing identification of a target website to be accessed;
a crawler route server; and
at least one crawler server configured to connect respectively to the crawler route server and report speed of accessing the target websites to the crawler route server,
wherein the crawler route server is configured to receive the webpage access request from the client, and to obtain a target crawler server which has the fastest speed for accessing the target website corresponding to identification of the target website to be accessed from at least one crawler server and return the identification of the target crawler server to the client;
and wherein before the crawler route server obtains the target crawler server which has the fastest speed, the crawler route server is further configured to:
receive network speed for accessing the target website last time reported by each crawler server among the at least one crawler server, wherein the network speed for accessing the target website last time is a reciprocal of connection time that each crawler server connects to the target website when accessing the target website last time; and
store the network speed for accessing the target website last time reported by each crawler server.

* * * * *